United States Patent [19]
Shaughnessy et al.

[11] Patent Number: 5,928,325
[45] Date of Patent: Jul. 27, 1999

[54] METHOD OF DYNAMICALLY ESTABLISHING COMMUNICATION OF INCOMING MESSAGES TO ONE OR MORE USER DEVICES PRESENTLY AVAILABLE TO AN INTENDED RECIPIENT

[75] Inventors: Mark L. Shaughnessy, Algonquin; Michael D. Kotzin, Buffalo Grove; Lester F. Eastwood, Jr., Barrington Hills; Gary W. Grube, Barrington, all of Ill.

[73] Assignee: Motorola, Inc., Schaumburg, Ill.

[21] Appl. No.: 08/806,239

[22] Filed: Feb. 24, 1997

[51] Int. Cl.⁶ .................................................. G06F 17/00
[52] U.S. Cl. ............................................................. 709/206
[58] Field of Search ......................... 395/200.36, 200.48, 395/200.68, 200.69, 200.7, 200.71, 200.79, 200.76, 200.54; 455/461, 417; 379/210; 340/825.44

[56] References Cited

U.S. PATENT DOCUMENTS

| 5,252,951 | 10/1993 | Tannenbaum et al. . |
| 5,493,692 | 2/1996 | Theimer et al. . |
| 5,555,376 | 9/1996 | Theimer et al. . |
| 5,594,947 | 1/1997 | Grube et al. . |
| 5,715,397 | 2/1998 | Ogawa et al. ..................... 395/200.76 |
| 5,742,905 | 4/1998 | Pepe et al. ............................. 455/461 |

OTHER PUBLICATIONS

"Phoneshell: the Telephone as Computer Terminal" by Chris Schmandt Taken from the Proceedings of the ACM Multimedia Conference, Anaheim, CA, Aug. 1993.

"MailCall: Message Presentation and Navigation in a Non-visual Environment" by Matthew Marx and Chris Schmandt CHI 96 Apr. pp. 165–172.

Primary Examiner—Ellis B. Ramirez
Attorney, Agent, or Firm—Susan L. Lukasik

[57] ABSTRACT

A method of dynamically establishing real-time communication of incoming messages to one or more user devices presently available to an intended recipient. This is accomplished by intelligently coupling a central agent to a plurality of communication networks. The central agent, in response to a detected incoming message, identifies (i) a message recipient for whom the incoming message is destined, (ii) the known user devices associated with that recipient, and (iii) the networks servicing the identified user devices. The agent then polls all identified networks to determine which have user devices available right now and selects one or more of those to receive a message. The incoming message is then modified and transformed, in accordance with predetermined action rules, before transmitting the incoming message, in whole or in part, to the available user devices.

21 Claims, 3 Drawing Sheets

METHOD OF DYNAMICALLY ESTABLISHING COMMUNICATION OF INCOMING MESSAGES TO ONE OR MORE USER DEVICES PRESENTLY AVAILABLE TO AN INTENDED RECIPIENT

FIELD OF THE INVENTION

This invention is directed generally to the field of RF (Radio Frequency) communication systems, and more particularly to providing communication of incoming messages to available resources.

BACKGROUND OF THE INVENTION

Technology is evolving at an amazing pace. More and more information can be communicated over an RF medium to an individual. It is becoming commonplace for individuals to carry with them, or be within easy access, of a variety of wireless communication devices. One such communication device, for example, is a PCS (personal communication services) phone. The types of services provided thereby may include telephone interconnect calling, reception of data transmissions and/or certain voice transmissions, private calling, group calling, etc. Generally, such devices are part of a large radio communication system consisting of a communication resource controller and one or more communication resources where the communication resources may be an RF channel, a pair of RF channels, a TDM slot, or any medium for carrying RF signals.

Pagers, including alphanumeric display pagers and pagers with voice mail capability for storing voice messages, are another type of communication device. Paging systems are well known and like conventional wireless telephony systems also typically comprise a resource controller communicating over selected coverage areas using predefined communication resources. More modern technologies, such as PCS phones, provide a broad scope of wireless communication devices by integrating voice, data and paging, by way of example, into a unitary, integrated communication system. A PCS user can have access to a variety of services of incompatible format all from a single portable unit. Other types of fast emerging communication devices are portable (hand-held) graphics terminals, such as Motorola's Personal Digital Assistant (PDA). Portable graphics terminals display data, transmitted over a wireless RF medium from a central controller in a PDA system, in graphical form.

In situations where different services are not integrated into one communication system, each device associated with a particular system is typically assigned a unique user id. That id is typically unique to the device, and an individual has a different id for each device (phone, pager, PDA, etc.) which he may carry with him. When a communication message is desired to be sent to a specified user id, to initiate the communication—for example in a trunked radio system—a calling unit or device places a request to its associated resource controller via a communication resource dedicated for control information (control channel). The communication request can include a request for a particular service, such as allocation of a communication resource and includes the identity of a target (receiving) communication device (or devices if group call).

Upon receiving a request to transmit a call (message) in a format specific to the system in which the call (message) was initiated, the communication resource controller of that system in which the call (message) was initiated determines whether the target unit is registered, or otherwise in a state ready to receive the call (message).

If ready, then the resource controller grants the request. If not ready, such as when a target device is temporarily in a power-down mode, or currently involved in another call, out-of-range, out-of-service, etc., then the call (message) transmission to the target might be aborted. To illustrate, assuming a voice message is attempted to a portable radio carried by a businessman on travel, but whose phone may be out-of-range, left home, etc., that individual would not be able to receive, or even be aware, of any incoming calls. Although this same individual may have with him another device(s) such as for example a pager, a laptop, a PDA, etc., currently there is no way to be able to direct the voice message to another device. One obvious reason for this difficulty is that the respective network systems servicing the various user devices available to the individual are typically stand-alone, non-integrated, non-communicating systems. Another reason is that these systems lack the functionality to convert incoming messages in one format (e.g., text) to another format (e.g., voice). This is crucial because an alphanumeric display pager cannot process voice messages, and a portable phone cannot voice a text message.

U.S. Pat. Nos. 5,555,376 and 5,493,692 to Theimer et al. generally teach methods to deliver messages to mobile users, e.g., within an office building, on devices, e.g., computer terminals or printers, that the users are in proximity to. To determine where people are in relation to plural communication devices disposed throughout a given geographic location, the use of a separate location facility such as an RF tag badge network (or even GPS receivers) is proposed. When the target device is a display device, the communication system includes functionality, by way of a central agent, which determines which proximal display device provides sufficient privacy for a given transmission. The system determines the communication path from the agent to the user. The disclosed methods are merely an extended form of message call-forwarding to a target device capable of receiving the message in its original transmission. The Theimer patents make possible tracking, for example, an individual's location and forwarding a phone (voice) call message to a phone or mobile unit closest in proximity. The forwarding decision does not involve forwarding a message in one type format (e.g., a voice transmission directed to a currently non-registered specified unit of an identifiable user) to another communication device which is currently active but which is not designed to recognize voice transmissions received in the format of the original target unit.

The conversion of information in one file format to another file format prior to transmission is well known and forms no part of the present invention. While message format transformation is well known for various applications, such as for example converting an email message to voice for retrieval of same over a telephony system, it is not known to provide a means which automatically performs data transformation on the content of a call or message when the original target device is unavailable.

Commonly assigned U.S. Pat. No. 5,594,947 to Grube et al. discloses a method for providing alternate communication services to a target unit. A decision is made by the central controller in a radio communication system as to whether certain types of RF transmissions, from a source unit, are to be prohibited as a function of a target unit's present geographic location. If so, the request for communication with the target is denied and an alternative service request to the same unit, may be automatically processed by the central controller instead. Here again, there is no transformation of data from one file format, corresponding to that of an original target unit associated with a given communication network, to that of a second file format, corresponding to that of an automatically selected alternative target unit associated with a different communication network.

DETAILED DESCRIPTION OF THE PREFERRED EMBODIMENTS

Generally, the present invention provides a method of dynamically establishing real-time communication of incoming messages to one or more user devices presently available to an intended recipient. This is accomplished by intelligently coupling a central agent to a plurality of communication networks. The central agent, in response to a detected incoming message, identifies (i) a message recipient for whom the incoming message is destined, (ii) the known user devices associated with that recipient, and (iii) the networks servicing the identified user devices. The agent then polls all identified networks to determine which have user devices available right now and selects one or more of those to receive a message. The incoming message is then modified and transformed, in accordance with predetermined action rules, before transmitting the incoming message, in whole or in part, to the available user devices.

Because the intelligence for identifying, modifying and transforming messages amongst different known formats (e.g., voice, text, digital image, multimedia file, multimedia stream, video file, etc.), each compatible with an associated recipient user device, is provided by the central agent, little or no intelligence is required on the part of the communication networks. Consequently, the present invention allows functionally integrating existing networks together very easily and cost-effectively, yet maintaining the benefits of having multiple non-integral user devices associated with distinct and separate networks.

Figure 1:
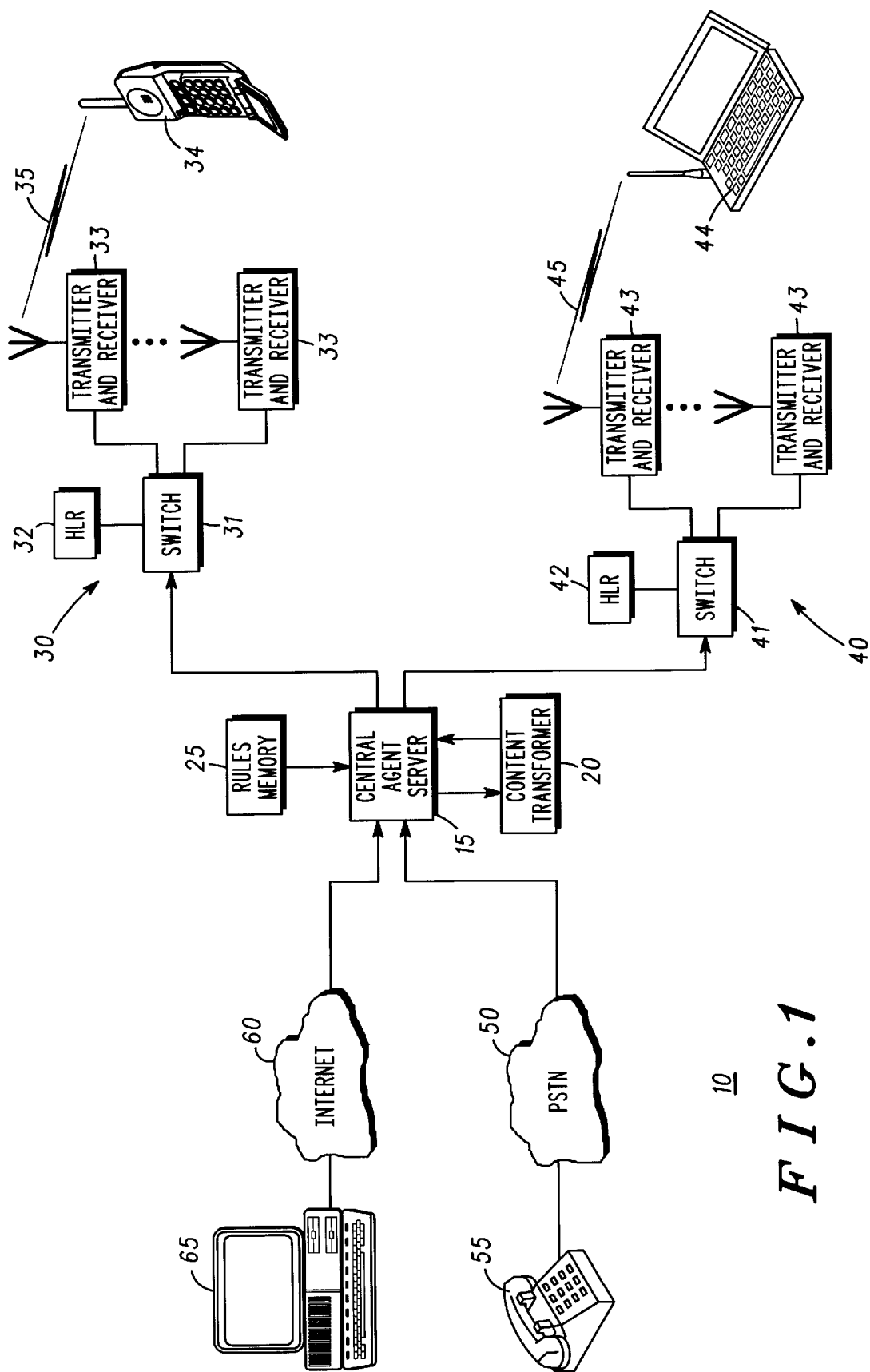
FIG. 1 is a block diagram of an exemplary communication system including a central agent coupled to a plurality of communications networks to facilitate message transmits in accordance with the present invention.
Figure 2:
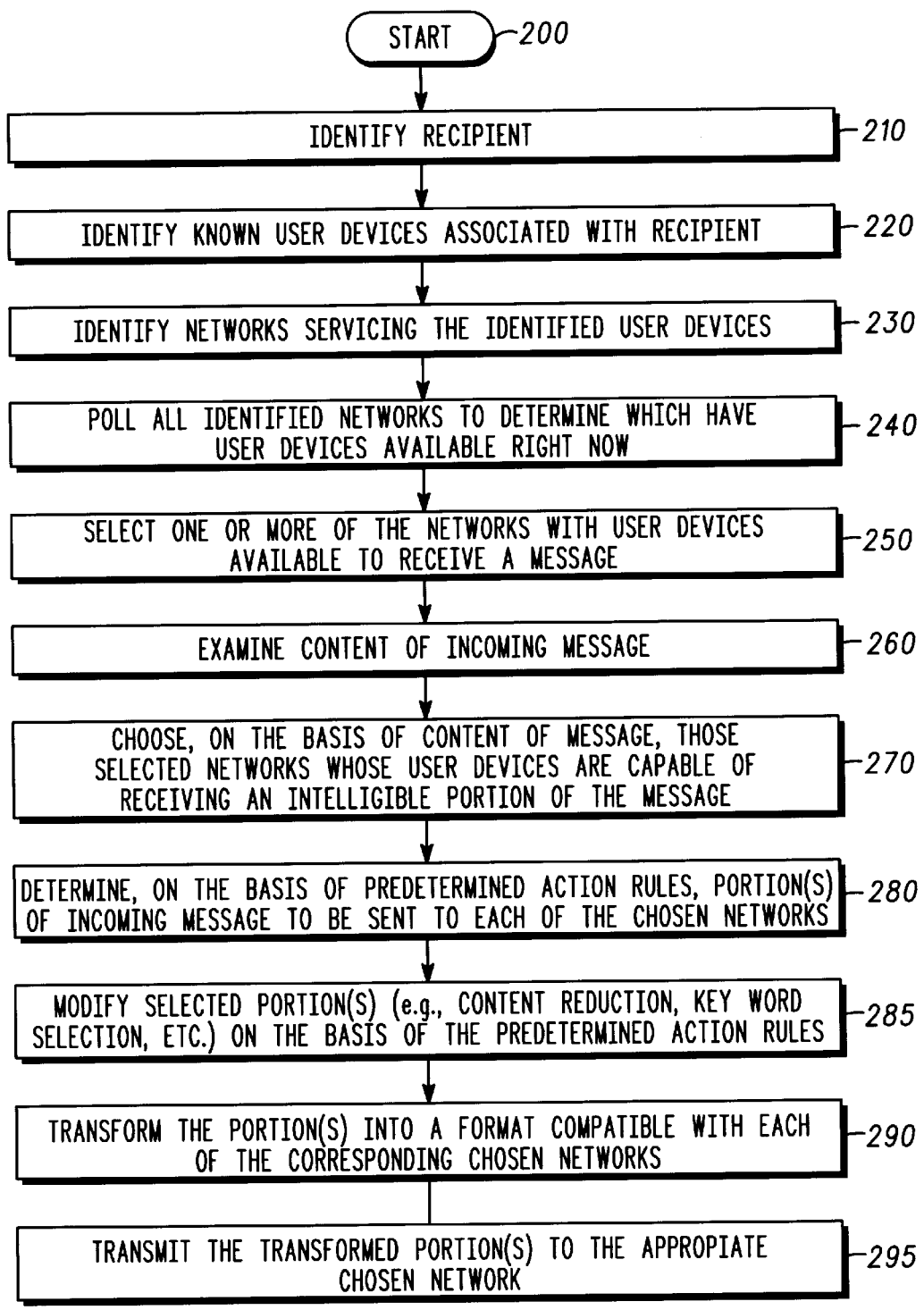
FIG. 2 is a flow diagram that may be used to implement the present invention.

The present invention can be more fully described with reference to FIGS. 1 and 2. FIG. 1 illustrates a communication system 10 that includes a central agent (server) 15 coupled to a content transformer 20 and a rules memory device 25. In the illustrative embodiment, the central agent 15 is shown communicating with a plurality of communication networks 30–60. Network 50, as shown, is a conventional cellular phone network typically comprising a central controller switch 31, connecting the cellular phone network 50 to the central agent 15 which may be embodied with a communications computer, the switch 31 typically being a standard cellular Multi-Site Controller (MSC), a home location register (HLR) database 32 coupled to the switch 31, the HLR typically comprises a computer, and a plurality of transmitter/receiver antennas 33 for communicating to a cellular phone 34 subscribers, over a limited number of communication resources 35.

Messages from the central agent 15 are communicated to the central controller switch 33 which queries a home location register (HLR) server 32 to retrieve the ID of the corresponding cellular phone 34, associated with the recipient identified by the central agent 15, and site location 33 of the cellular phone 34. The central controller switch 31 also responds to inquiries from the central agent 15, as to the availability status of any user devices (cellular phone 34) owned by a central-agent-identified recipient of an incoming message. Within the cellular network 30, any phone 34 may initiate a communication to another network (e.g., networks 40–60) (or to another phone on the same cellular network 30) by transmitting a request to the central controller switch 31, and can receive a communication message in a predetermined format type and upon registration with the network 30, by the assignment of a communication resource 35 by the central controller switch 31.

In the illustrative embodiment, the cellular network 30 shown is for voice transmissions services only, such as in conventional trunking systems such as Motorola SmartZone™ or OmniLink™ Systems, but may also be an integrated system such as Motorola's iDEN™ System which can handle multiple services, such as telephone interconnect calling, data transmissions, private calling, group calling, etc.

Communication network 40 is a conventional graphics computing devices network including a host controller switch 41, an HLR 42 and a plurality of receiver/transmitter antennas 43 for communicating digital image information, among other types of information (transmit messages) to associated portable graphics terminals 44 over assigned communication resources 45.

Referring to FIG. 1, cellular network 30 and graphics display network 40 are in communication, via central agent 15, with network 50 which is a conventional wireline PSTN (public switched telephone network). PSTN 50 facilitates communication of voice and data transmissions, sourced from regular wireline telephones 55 or the like, to wireless network systems, such networks 30, 40.

The central agent 15 is also adapted to receive file transfer, email, data transmissions, video file, digital images, and the like from a host computer 65 coupled directly thereto or, as in the illustrative embodiment, via an internet link 60. As configured, central agent 15 facilitates communicating received messages from host computer 65 to one or more wireless user devices, 34, 44 available right now to receive those messages.

The central agent 15 integrates the networks 30–60 by providing the functionality to make possible the exchange of messages between the network systems such that a prospective message recipient who for example carries or has available to him multiple user devices can receive a voice message originally intended for his mobile communication unit (e.g., phone 34) but because the unit is currently unavailable, as determined by an HLR inquiry (e.g. HLR 32), the central agent 15 will automatically transform the voice message into a data signal and communicate it instead to the host controller switch 41. The host controller switch 41 in turn takes the necessary action to alternatively transmit the message for display to the graphics terminal 44.

When a message sourced by one network is intended for transmission to one or more user devices on another network (s), that message is communicated to the central agent 15 which will process it and put it in a form which is understood by the receiving network(s). General operation of the central agent 15 will now be described with reference to the flow diagram depicted in FIG. 2.

Upon receipt of the message, the central agent 15 first identifies the intended recipient of the message (210) and does a table lookup in an internal database (not shown) to determine what user devices are currently logically assigned to the identified recipient of the message (220). Identification of a recipient may involve merely comparing a called number associated with the recipient to a list of known database users.

The central agent 15 then identifies, from a predefined internal database list, those networks servicing the user devices identified as belonging to the intended message recipient (230). The central agent 15 then polls all the attached wireless networks (30, 40) identified as servicing recipient's user devices to determine which have a registered recipient user device available to receive the incoming message right now (240). The various wireless networks, respond with such information, by a simple HLR 32, 42, table look up operation, in a known manner.

Once all the networks have responded, the central agent 15, on the basis of predetermined user-device select rules, selects one or more available recipient user devices to which to send a message transmit. The user-device select rules may involve a simple table-look up operation, or may involve a decisional operation based, for example, on such factors as the format type of message originally received by the central agent 15, the source of the message, and/or the usefulness of sending one type of message to a particular wireless user device (e.g., probably not useful to send a digital image as voice transmission to a cellular phone, if such were possible) (250–270).

When the device(s) to send the message have been selected by the central agent 15, the incoming message content is considered and, on the basis of predetermined action rules stored in rules memory 25, the central agent 15 identifies and isolates portions of the message that, as determined in advance, are desirable for sending to the selected currently available devices (280) on the chosen network(s). It is conceivable that the central agent 15 may deem desirable to send the same message or the same portion of a message to more than one currently available user device (e.g., sending email text as text to alphanumeric pager, as well as in voice to a cellular phone).

Because the format type of the incoming message will not typically be compatible with that of the chosen networks, and more particularly, with that which the selected available devices can process, the central agent 15 may first modify (on the basis of predefined relational action rules) the portions destined for a particular selected device (285). Modification of messages may involve, for example, (i) reducing the content of a text message before transforming the message, to transmit only predetermined portions of a message; or (ii) selecting portions of a message to transmit as a function of certain keywords present in the text message—i.e., keywords the central agent is expecting to receive (e.g., current "stock price" information of "Motorola, Inc." recited in email text). In another case, modification may involve reducing the resolution of digital images, derived from converting a video stream into a short sequence of images, for transmitting for example to a low resolution graphics terminal.

After the incoming message has been modified for transmitting, the only thing that remains is transforming the modified sets of the incoming message portions into a type format the respective networks the available recipient user devices are on, will understand (290). After the transformation step is completed, the transformed sets of the original incoming message are transmitted to the appropriate chosen networks.

Figure 3:
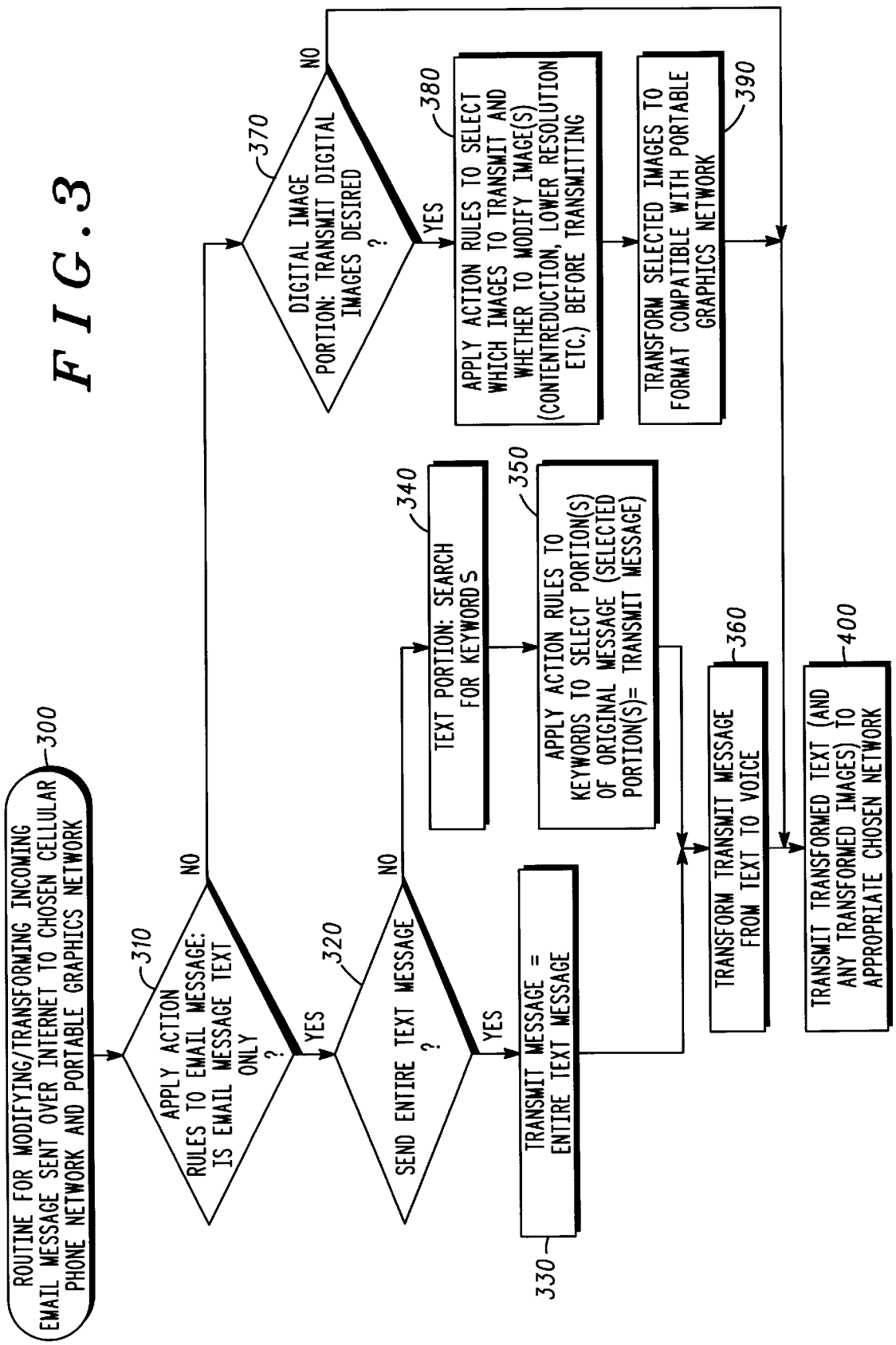
FIG. 3 is a flow diagram chart of an illustrative embodiment for modifying/transforming incoming email messages sent over the internet to a recipient's exemplary available user devices in accordance with the present invention.

FIG. 3 is a flow diagram chart of an illustrative embodiment for modifying/transforming incoming email messages sent over the internet to a recipient's exemplary available user devices in accordance with the present invention.

An illustrative implementation will now be described of the central agent 15 receiving an incoming email message directed to an identified recipient. Initially, the central agent 15 will attempt, substantially as explained above in connection with FIG. 2, to identify those networks having an available device to which all or part of an email message may be sent. In the present example, it is assumed that the cellular network 30 can receive voice transmissions from the central agent 15 for transmission to the currently available cellular phone 34 of the intended recipient. It is also assumed that the same recipient has with him a graphics terminal 34 with which to receive digital images from the portable graphics network 40.

Once the availability of the recipient user devices is ascertained, the central agent 15 will examine the content of the email message to determine how it should proceed. Referring to FIG. 3, the central agent 15 first will consider whether the email message includes digital images, in addition to text, that may require transmitting to the available devices (cellular phone 34, graphics terminal 44)(310).

If the email message is a text-only message (320), then if the action rules authorize processing the whole message (330), then the entire message is selected for transmission, otherwise only portions of the message will be selected for transmission (340). In the example provided, selected portions of the text are chosen for transmission as a function of identified keywords in the text. The selection of such portions is determined by the set of action rules programmed by the system designer to achieve the intended task (e.g., sending Motorola's current stock price) (350). Once the central agent 15 isolates where the transmit text is destined (in the present example, the cellular phone network), it transforms the text to voice, using any conventional circuitry for this purpose (not shown) (360).

If on the other hand the email message contains other non-text data, such as for example digital image data, the central agent 15 use appropriate action rules to determine whether it should process such data for transmit to the available graphics terminal (370). If so, then the image(s) are modified in accordance with action rules for achieving this purpose (380). After the requisite modifications are performed, the images are transformed (390) and together with the text transformed portion of the original email message transmitted (400), by the central agent 15, to the portable graphics network 40 and the cellular phone network 30, respectively.

It should be appreciated by one skilled in the art that the same principles as described above for communicating an email message from one network to one or more messages to be received by separate logical communications (wireless) networks which typically do not share resources, can be extended to any number of analogous applications.

For instance, let's consider the case where the central agent 15 receives a video email file. Assume for a second that the agent 15, after querying all the communication networks coupled thereto determines that the intended recipient does not have his video phone, but instead has a portable graphics terminal capable of displaying images, and a mobile phone for voice. The agent 15 may, in accordance with the present invention, convert the video sequences into a short sequence of images which it could transmit, using conventional methods, in a stream (e.g., one every five seconds) to the network servicing the recipient's portable graphics terminal, while simultaneously also transmitting the voice portion over the cellular phone network.

PCS phones have integrated voice, data, paging functionality. However, these devices are costly. The present invention can operate as an alternative solution to having a user spend extra money on a PCS phone, say to receive an alphanumeric page, when an individual already owns a pager. The present invention also provides an alternative way to communicate with that individual (e.g., by automatically sending an alphanumeric message to his pager) in the event he has forgotten his mobile phone or has forgotten to turn it on and is therefore unable to receive calls. An integrated service communication device, such as PCS, does not offer the same advantages because if the unit is off, no service can be received. Alternatively, if the person forgets to bring the phone with him, he cannot be reached using any of the integrated services incorporated into his PCS phone.

It should be appreciated that although the message format types of various commonly available user devices (pagers, mobile phones, PDAs, portable computers, etc.) all communicate information in predetermined format types, including text message, voice message, image file, multimedia file, multimedia stream, video file, video stream and other such well known format types, the resulting effect of the central agent 15 is the integration of the various associative networks into one system 10.

Although the invention has been described in terms of a preferred embodiment, it will be obvious to those skilled in the art that many modifications and alterations may be made without departing from the invention. Accordingly it is intended that all such modifications and alterations be considered as within the spirit and scope of the invention as defined by the appended claims.

We claim:

1. In a communication system including a central agent coupled to a plurality of communication networks of the type facilitating communication of messages in predetermined format types to associated user devices, a method comprising the central agent performed steps of:
   detecting an incoming message and identifying its content;
   identifying a recipient for whom the incoming message is destined;
   interrogating said plurality of networks to identify an associated registration status of the user relative thereto;
   generating, on the basis of the associated registration status information, a list of the corresponding user devices currently available to the recipient for receiving messages;
   automatically selecting from said list, on the basis of the incoming message content, a user device from at least one of said networks over which to communicate at least a respective portion of the incoming message;
   converting said respective portion of the incoming message to the corresponding predetermined format type of the at least one selected network; and
   transmitting the respective converted message to said at least one selected network.

2. The method of claim 1, wherein said step of detecting an incoming message includes the step of identifying the format type of the incoming message.

3. The method of claim 2, wherein the format type of said incoming message is at least one of a text message, a voice message, an image file, a multimedia file, a multimedia stream, a video file and a video stream.

4. The method of claim 1, wherein said respective converted message is at least one of a text message, a voice message, an image file, a multimedia file, a multimedia stream, a video file and a video stream format type.

5. The method of claim 1, wherein the step of automatically selecting includes the steps of:
   automatically selecting at least two networks over which to communicate different portions of the incoming message; and
   identifying the associated different portions of the incoming message to be converted prior to transmitting to the corresponding at least two selected networks.

6. The method of claim 5, wherein the incoming message is a multimedia file,
   the step of automatically selecting at least two networks over which to communicate different portions of the incoming message including the steps of:
      selecting a first network coupled to a first user device capable of displaying a video stream portion of the multimedia file; and
      selecting a second network coupled to a second user capable of outputting an audio stream portion of the multimedia file,
   the step of identifying the associated portions of the incoming message including the step of detecting a corresponding video stream portion and a corresponding audio stream portion from the multimedia file.

7. The method of claim 6, wherein the step of identifying the associated different portions of the incoming message to be converted prior to transmitting to the corresponding at least two selected networks is performed automatically.

8. The method of claim 5, wherein the step of identifying the associated different portions of the incoming message to be converted prior to transmitting to the corresponding at least two selected networks is performed automatically.

9. The method of claim 1, wherein the step of selecting includes the step of automatically selecting at least two networks of different associated format types over which to communicate the same portion of the incoming message.

10. The method of claim 1, wherein at least one of said plurality of networks is a wireless network.

11. The method of claim 1, wherein said at least one wireless network is one of a paging, cellular voice, packet data, and video network.

12. The method of claim 1, wherein the incoming message is an email message and the transmitted message is a text-to-voice translated message.

13. In a communication system including a central agent coupled to a plurality of communication networks of the type facilitating communication of messages in predetermined format types to associated user devices, a method for redirecting incoming calls to currently available user devices, the method comprising the central agent performed steps of:
   identifying a recipient for whom an incoming message is destined;
   interrogating a network assigned to service the incoming message among the plurality of networks to identify a user device-not-available condition;
   interrogating the remaining networks to identify an associated registration status of the recipient relative thereto;
   generating, on the basis of the associated registration status information, a list of the corresponding user devices serviced by the remaining networks and currently available to the recipient for receiving messages;

automatically selecting from said list, on the basis of the incoming message content, a user device from at least one of said networks over which to communicate at least a respective portion of the incoming message;

converting said respective portion of the incoming message to the corresponding predetermined format type of the at least one selected network; and transmitting the respective converted message to said at least one selected network.

14. The method of claim 13, wherein said step of identifying a recipient involves comparing a called number associated with the user to a list of known database users.

15. The method of claim 13, wherein the format type of said incoming message is at least one of a text message, a voice message, an image file, a multimedia file, a multimedia stream, a video file and a video stream.

16. The method of claim 13, wherein said respective converted message is at least one of a text message, a voice message, an image file, a multimedia file, a multimedia stream, a video file and a video stream format type.

17. The method of claim 13, wherein the step of automatically selecting includes the steps of:

automatically selecting at least two networks over which to communicate different portions of the incoming message; and identifying the associated different portions of the incoming message to be converted prior to transmitting to the corresponding at least two selected networks.

18. The method of claim 17, wherein the incoming message is a multimedia file, the step of automatically selecting at least two networks over which to communicate different portions of the incoming message including the steps of:

selecting a first network coupled to a first user device capable of displaying a video stream portion of the multimedia file; and selecting a second network coupled to a second user device capable of outputting an audio stream portion of the multimedia file, the step of identifying the associated portions of the incoming message including the step of detecting a corresponding video stream portion and a corresponding audio stream portion from the multimedia file.

19. The method of claim 18, wherein the step of identifying the associated different portions of the incoming message to be converted prior to transmitting to the corresponding at least two selected networks is performed automatically.

20. The method of claim 17, wherein the step of identifying the associated different portions of the incoming message to be converted prior to transmitting to the corresponding at least two selected networks is performed automatically.

21. The method of claim 13, wherein the step of automatically selecting includes the step of selecting at least two networks of different associated format types over which to communicate the same portion of the incoming message.

* * * * *